(12) United States Patent
Hwang et al.

(10) Patent No.: US 8,861,122 B1
(45) Date of Patent: Oct. 14, 2014

(54) SYSTEMS AND METHODS FOR SYNC MARK BASED READ OFFSET DETECTION

(71) Applicant: LSI Corporation, San Jose, CA (US)

(72) Inventors: Eui Seok Hwang, San Jose, CA (US); Richard Rauschmayer, Longmont, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/108,282

(22) Filed: Dec. 16, 2013

Related U.S. Application Data

(60) Provisional application No. 61/916,199, filed on Dec. 14, 2013.

(51) Int. Cl.
*G11B 5/596* (2006.01)

(52) U.S. Cl.
CPC .................................. *G11B 5/59616* (2013.01)
USPC .......................................... 360/55; 360/77.06

(58) Field of Classification Search
None
See application file for complete search history.

(56) References Cited

U.S. PATENT DOCUMENTS

| | | | | |
|---|---|---|---|---|
| 5,691,857 | A * | 11/1997 | Fitzpatrick et al. | 360/77.06 |
| 6,967,808 | B1 * | 11/2005 | Bandic et al. | 360/77.08 |
| 6,975,471 | B2 * | 12/2005 | Bandic et al. | 360/77.02 |
| 6,995,938 | B2 * | 2/2006 | Coker et al. | 360/75 |
| 7,064,914 | B1 * | 6/2006 | Erden et al. | 360/77.01 |
| 7,193,800 | B2 * | 3/2007 | Coker et al. | 360/75 |
| 7,405,899 | B2 * | 7/2008 | Ryu et al. | 360/77.02 |
| 7,502,193 | B2 * | 3/2009 | Albrecht et al. | 360/75 |
| 7,573,669 | B2 * | 8/2009 | Saikawa et al. | 360/75 |
| 7,710,676 | B1 * | 5/2010 | Chue | 360/49 |
| 8,305,705 | B1 * | 11/2012 | Roohr | 360/77.04 |
| 8,498,071 | B2 * | 7/2013 | Grundvig et al. | 360/51 |
| 8,611,037 | B2 * | 12/2013 | Kawabe et al. | 360/77.04 |

* cited by examiner

*Primary Examiner* — Wayne Young
*Assistant Examiner* — James L Habermehl
(74) *Attorney, Agent, or Firm* — Hamilton DeSanctis & Cha

(57) ABSTRACT

A data processing system includes a cross-correlation calculator operable to calculate cross-correlations between an input signal and each of three different sync patterns associated with a target track and neighboring tracks, a detector operable to select a largest of the cross-correlations, a threshold comparator operable to compare the cross-correlations with a threshold to determine a direction of any position error of a read head, and a position error estimator operable to estimate a position error of the read head based at least in part on the cross-correlations.

20 Claims, 5 Drawing Sheets

US 8,861,122 B1

SYSTEMS AND METHODS FOR SYNC MARK BASED READ OFFSET DETECTION

CROSS REFERENCE TO RELATED APPLICATIONS

The present application claims priority to (is a non-provisional of) U.S. Pat. App. No. 61/916,199, entitled "Systems and Methods for Sync Mark Based Read Offset Detection", and filed Dec. 14, 2013 by Hwang et al, the entirety of which is incorporated herein by reference for all purposes.

FIELD OF THE INVENTION

Various embodiments of the present invention provide systems and methods for detecting read head position, and more particularly to systems and methods for sync mark based read offset detection.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. It is important to correctly position the read/write head assembly over the track to be able to correctly retrieve the data.

SUMMARY

Various embodiments of the present invention provide systems and methods for detecting read head position, and more particularly to systems and methods for sync mark based read offset detection.

A data processing system is disclosed including a cross-correlation calculator operable to calculate cross-correlations between an input signal and each of three different sync patterns associated with a target track and neighboring tracks, a detector operable to select a largest of the cross-correlations, a threshold comparator operable to compare the cross-correlations with a threshold to determine a direction of any position error of a read head, and a position error estimator operable to estimate a position error of the read head based at least in part on the cross-correlations.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Embodiments of the present invention are related to systems and methods for estimating cross-track read head position errors, also referred to herein as the read offset, and down-track write phase offsets. At least three different sync marks are used on a magnetic disk platter to indicate the location of the start of user data, with a different sync mark used on each neighboring data track. By using at least three different sync marks, the sync marks in a target track being read and its adjacent tracks, the preceding neighboring track and the following neighboring track, are all different. The different sync marks are orthogonal to each other, or near-orthogonal, also referred to herein as soft-orthogonal, so that the cross-correlation values between each of the different sync marks are relatively low. This enables detection of the sync mark in the target track while avoiding false detection of the sync marks in the neighboring tracks.

Based on the contributions of the sync marks in the readback signal from the read head, the position errors and write phase offsets can be estimated. The estimated write phase offset can be used in processing the readback signal to facilitate correct detection and decoding of the data, for example by adjusting the sampling phase and rate, equalization filter adjustment, etc. This also enables the read head to be correctly positioned over the center line of the target track to reduce or eliminate the position error so that data can be correctly detected and decoded. As track density increases in magnetic recording, the shingling or overlapping between neighboring data tracks in two-dimensional magnetic recording (TDMR) becomes more aggressive. This makes positioning the read head at the center of the track (without position error) more difficult. Thus, by estimating the position error and/or write phase offsets from the readback signal, that information can be provided to processing elements such as, but not limited to, an analog to digital converter, equalizer or detector to customize their operation in favor of the provided information.

By carefully generating the sync mark patterns, they can be made orthogonal or near-orthogonal not only to each other but to the known preamble patterns preceding the sync marks in the data tracks, and also can be made to have a relatively low cross-correlation with unknown user data bits that follow the sync marks, based on characteristics of the unknown user data bits such as their run-length limited (RLL) encoding or maximum transition run (MTR) encoding. In some embodiments, the different sync mark patterns with either hard or soft orthogonality are selected using an exhaustive search, comparing candidate sync mark patterns with each other and calculating the auto-correlation and cross-correlation values.

Figure 1:
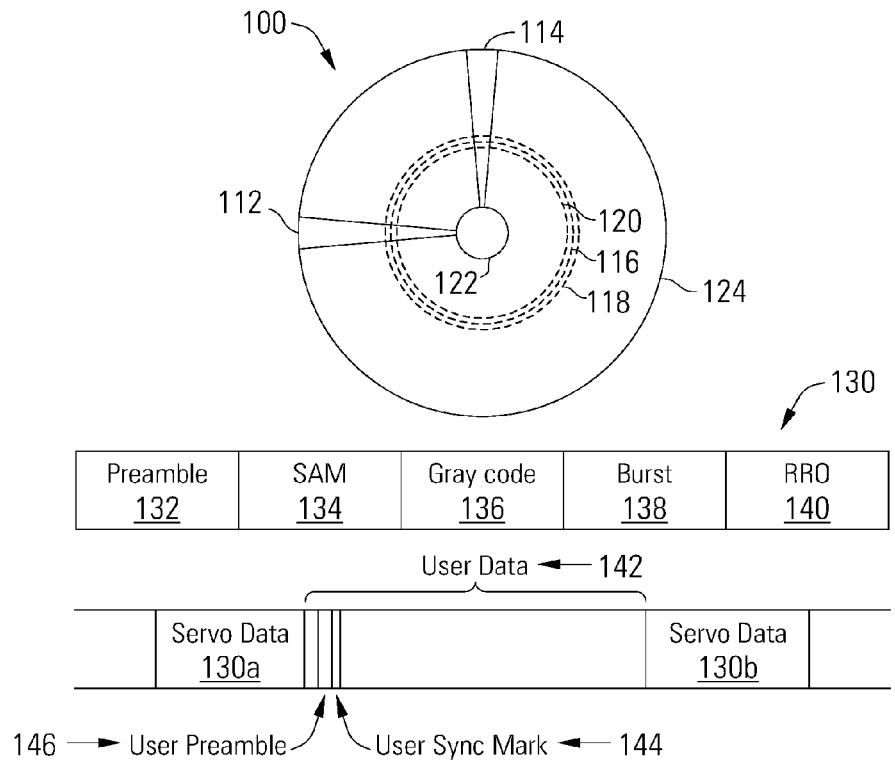
FIG. 1 is a diagram of a magnetic storage medium and sector data scheme which can be used with sync mark based read offset detection in accordance with some embodiments of the present invention.

Turning to FIG. 1, a magnetic storage medium 100 with an example target data track 116 and its two neighboring data tracks 118, 120 are shown on a magnetic disk platter 124, indicated as dashed lines. Each of the data tracks 116, 118, 120 have a different sync mark pattern, from which the position errors and write phase offsets are estimated.

The tracks 116, 118, 120 are segregated by servo data written within wedges servo 112, 114. It should be noted that while two tracks 116, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, followed by a Gray code 136, a burst field 138, and a repeatable run-out (RRO) field 140. A servo data set may have two or more fields of burst information, and different information may be included in the servo fields. Between the servo data bit patterns 130a and 130b, a user data region 142 is provided. User data region 142 may include one or more sets of data that are stored to storage medium 100. The data sets may include user synchronization information some of which may be used as a mark to establish a point of reference from which processing of the data within user data region 142 may begin.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. As user data is read, the data dependent inter-track interference cancellation operation is performed. In a write operation, the sensor would sense servo data from wedge 112 then write data to the user data region between wedge 112 and wedge 114, with location information in the user data region provided by a user sync mark 144 and a user preamble 146.

As used herein, the phrase "sync mark" is used in its broadest sense to mean any pattern that may be used to establish a point of reference. Thus, for example, the different alternating sync mark patterns disclosed herein are used in some embodiments as user sync marks 144 as are known in the art, or for one or more portions of servo data bit patterns 130. Based upon the disclosure provided herein, one of ordinary skill in the art may recognize other sync marks that could be used in relation to different embodiments of the present invention.

Figure 2:
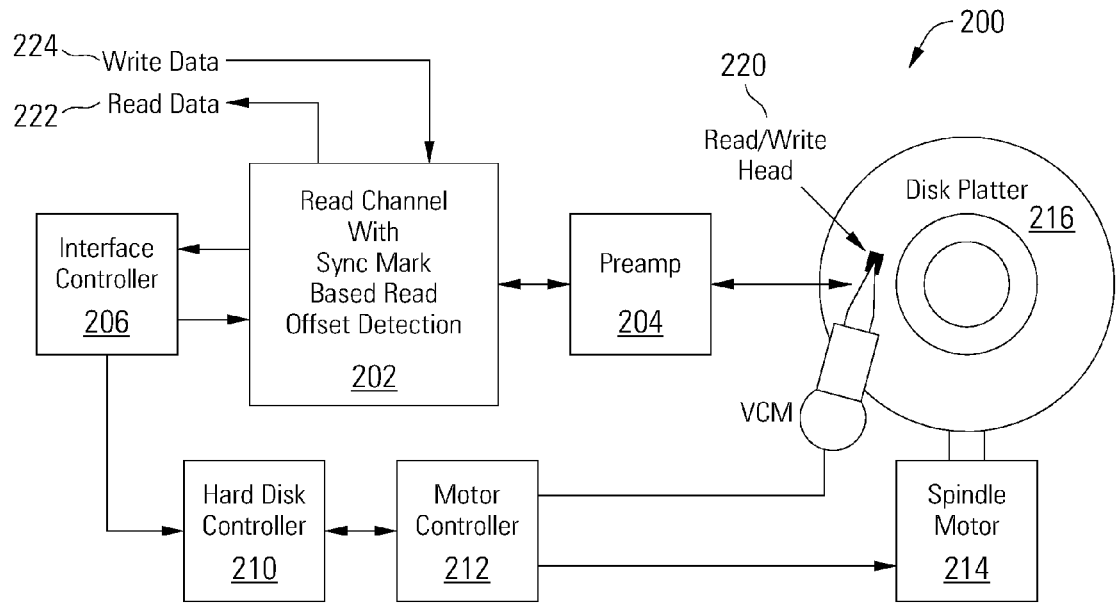
FIG. 2 depicts a storage system including a read channel with sync mark based read offset detection in accordance with some embodiments of the present invention.

Turning to FIG. 2, a storage system 200 is disclosed which includes a read channel circuit 202 with sync mark based read head position error and write phase offset estimation in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 estimates read head position error and write phase offset using multiple orthogonal or near-orthogonal sync marks, helping it to digitize, equalize, detect and decode the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. The sync mark based read head position error and write phase offset estimation can be implemented consistent with that disclosed in relation to FIG. 8. In some cases, methods of estimating read head position error and write phase offset can be performed consistent with the flow diagrams disclosed in relation to FIG. 7.

It should be noted that storage system 200 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 200 can be modified to include solid state memory that is used to store data in addition to the storage offered by disk platter 216. This solid state memory can be used in parallel to disk platter 216 to provide additional storage. In such a case, the solid state memory receives and provides information directly to read channel circuit 202. Alternatively, the solid state memory can be used as a cache where it offers faster access time than that offered by disk platter 216. In such a case, the solid state memory can be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
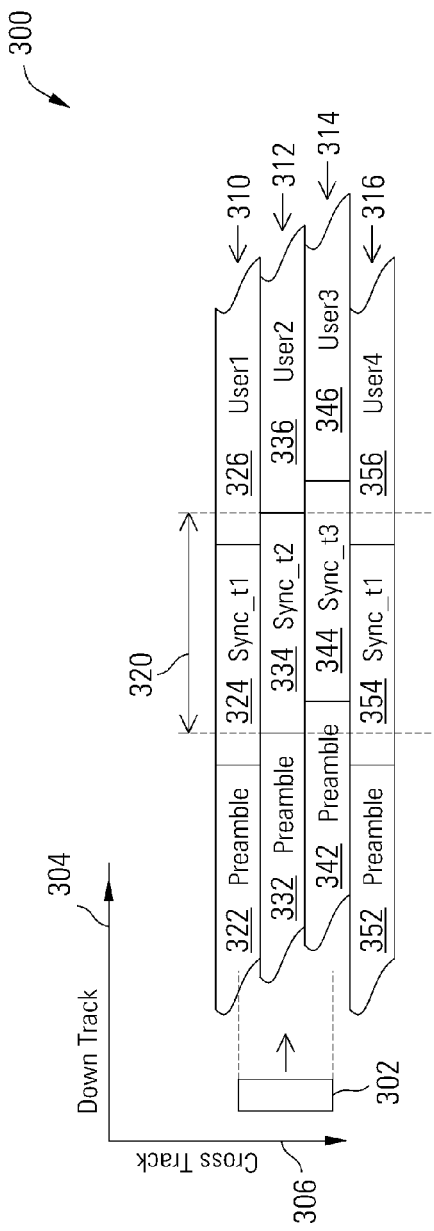
FIG. 3 depicts a read/write head and a portion of four neighboring data tracks with a relatively small down-track write phase offset in accordance with some embodiments of the present invention.

Turning to FIG. 3, a diagram 300 shows a read head 302 and a portion of four neighboring data tracks 310, 312, 314, 316 with a relatively small down-track write phase offset in accordance with some embodiments of the present invention. The down-track direction 304 runs along the curve around the disk platter 216, along a data track, and the cross-track direction 306 runs along a radius from the center to the edge of the disk platter 216, across the data tracks. The read head 302 is referred to herein as "wide" because it is wide enough to span the target track 312 and to overlap a portion of the preceding neighboring track 310 and the following neighboring track 314. The portion of the four neighboring data tracks 310, 312, 314, 316 shown in diagram 300 includes preambles, sync marks and user data. In track 310, preamble 322 is followed by sync mark 324, with a first sync pattern, followed by user data 326. In track 312, the target track given the position of the read head 302 in diagram 300, preamble 332 is followed by sync mark 334, with a second sync pattern, followed by user data 336. In track 314, preamble 342 is followed by sync mark 344, with a third sync pattern, followed by user data 346. In track 316, preamble 352 is followed by sync mark 354, with the first sync pattern, followed by user data 356. The tracks 310, 312, 314, 316 shown in diagram 300 have a relatively small write phase offset, so that the sync marks 324, 334, 344, 354 are substantially overlapping. Thus, when the read head 302 is reading sync mark 334, the readback signal will also contain a component based on sync mark 324 from the preceding neighboring track 310 for most of the time, followed by a component based on user data 326 for a short period while reading the end of sync mark 334. At the start of sync mark 334, the readback signal will also contain a component from preamble 342 in the following neighboring track 314, and then a component from sync mark 344 for most of the time reading sync mark 334.

If the read head 302 had a position error that shifted it toward data track 310 somewhat, the component of the readback signal from preceding neighboring track 310 would be increased in magnitude and the component of the readback signal from following neighboring track 314 would be reduced in magnitude. Because the sync marks 324, 334, 344 have different patterns, their contributions to the readback signal can be distinguished, and the cross-correlation values between the readback signal and each of the three sync patterns can be used to estimate the position error of the read head 302. While seeking within a cross-correlation search window 320 for the maximum cross-correlation values between the readback signal and each of the sync marks 324, 334, 344, the write phase offset can also be estimated.

When selecting the sync patterns to be used, patterns are identified with small cross-correlation values between each of them. As a result, when reading the target track 312, the cross-correlation between the sync pattern sync_t2 in sync mark 334 and the sync pattern sync_t1 in sync mark 324, shifted by the write phase offset between tracks 312 and 310, will be small. Similarly, the cross-correlation between the sync pattern sync_t2 in sync mark 334 and the sync pattern sync_t3 in sync mark 344, shifted by the write phase offset between tracks 312 and 314, will also be small. This desired relationship can be stated as:

$$xcorr(sync_{ti}, \text{shifted } sync_{tj}) \ll L \quad \text{(Eq 1)}$$
$$\forall\, i, j \in \{1, 2, 3\},\, i \neq j$$

where L is a threshold limiting the desired cross-correlation values between sync patterns in neighboring tracks.

Figure 4:
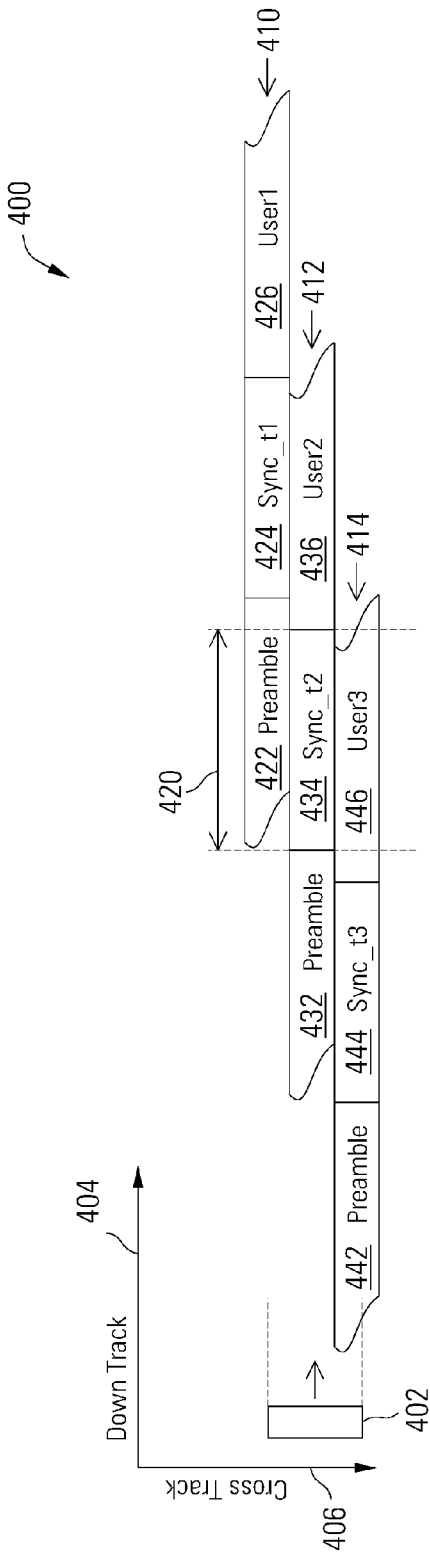
FIG. 4 depicts a read/write head and a portion of three neighboring data tracks with a relatively large down-track write phase offset in accordance with some embodiments of the present invention.

Turning to FIG. 4, a diagram 400 shows a read head 402 and a portion of three neighboring data tracks 410, 412, 414 with a relatively large down-track write phase offset in accordance with some embodiments of the present invention. The down-track direction 404 runs along the curve around the disk platter 216, along a data track, and the cross-track direction 406 runs along a radius from the center to the edge of the disk platter 216, across the data tracks. The read head 402 is referred to herein as "wide" because it is wide enough to span the target track 412 and to overlap a portion of the preceding neighboring track 410 and the following neighboring track 414. The portion of the four neighboring data tracks 410, 412, 414 shown in diagram 400 includes preambles, sync marks and user data. In track 410, preamble 422 is followed by sync mark 424, with a first sync pattern, followed by user data 426. In track 412, the target track given the position of the read head 402 in diagram 400, preamble 432 is followed by sync mark 434, with a second sync pattern, followed by user data 436. In track 414, preamble 442 is followed by sync mark 444, with a third sync pattern, followed by user data 446.

The tracks 410, 412, 414 shown in diagram 400 have a relatively large write phase offset, so that the sync marks 424, 434, 444 do not overlap. Thus, when the read head 402 is reading sync mark 434, the readback signal will also contain a component based on preamble 422 in the preceding neighboring track 410, and a component based on user data 446 in the following neighboring track 414. In this case, the write phase offset is large enough that the sync marks 424, 434, 444 do not fall within the cross-correlation search window 420 at the same time. However, the position error can still be estimated if the cross-correlations between the readback signal from read head 402 and each of the sync patterns are stored for delay or lag indices somewhat beyond the cross-correlation search window 420.

When selecting the sync patterns to be used, patterns are identified with small cross-correlation values between each of them and between them and preambles and unknown user data, based on constraints applied to the unknown user data. Examples of constraints on user data that can help in selecting sync patterns to yield desired cross-correlation values include, but are not limited to, run length limiting encoding, maximum transition run encoding, the Markov property of user bits such as a bit transition rate less than about 0.5 for a modulation encoded pattern, etc. As a result, when reading the target track 412, the cross-correlations between the sync pattern sync_t2 in sync mark 434 and the preamble 422 and the user data 446 in tracks 410 and 414, respectively, shifted by the write phase offset between tracks 410, 412, 414, will be small. This desired relationship can be stated as:

$$xcorr(sync_{ti}, \text{preamble}) \ll L \quad \text{(Eq 2)}$$
$$xcorr(sync_{ti}, \text{user data}) < L$$
$$\forall i \in \{1, 2, 3\}$$

where L is a threshold limiting the desired cross-correlation values between sync patterns in neighboring tracks.

The sync patterns can have any length desired. An example of three near-orthogonal sync patterns with length L=20 is as follows:

sync_t1 = [0 0 0 1 0 1 1 0 0 1 0 0 1 0 1 1 1 1 0 1]
sync_t2 = [1 0 0 0 1 1 1 0 1 0 1 0 0 1 1 1 0 0 0 1]
sync_t3 = [0 1 0 1 0 1 0 0 0 0 1 0 0 0 0 1 1 1 0 1]

An example of three near-orthogonal sync patterns with length L=32 is as follows:

sync_t1 = [1 0 0 1 1 0 1 0 0 0 1 0 1 1 1 1 0 1 0 0 1 0 1 1 1 1 1 0 1 1 1 1]
sync_t2 = [1 1 0 1 0 0 1 1 1 1 1 0 0 1 1 1 1 0 0 0 0 0 0 1 1 0 1 0 1 1 1 0]
sync_t3 = [1 1 1 1 0 1 0 0 0 0 0 1 1 1 0 1 0 1 1 1 1 1 1 0 1 0 1 1 0 1 0 1]

An example of three near-orthogonal sync patterns with length L=48 is as follows:

sync_t1 = [1 1 1 1 1 1 0 0 0 1 0 1 1 0 1 1 0 1 1 0 0 0 1 0 1 0 0 1 1 0 0 0 0 1 1 1 1 0 0 1 0 1 1 0 0 1 0 1]
sync_t2 = [1 0 1 1 1 1 0 1 1 0 1 0 1 0 1 0 0 0 1 0 0 1 0 0 1 1 1 0 1 1 0 0 0 1 1 1 1 0 1 1 0 0 0 1 0 1 0 1]
sync_t3 = [1 1 1 0 0 1 0 1 0 1 0 1 0 0 1 0 1 0 1 1 0 0 0 0 1 1 0 1 0 1 1 1 0 0 0 0 0 1 0 1 1 0 0 1 0 1 0 0]

Figure 5:
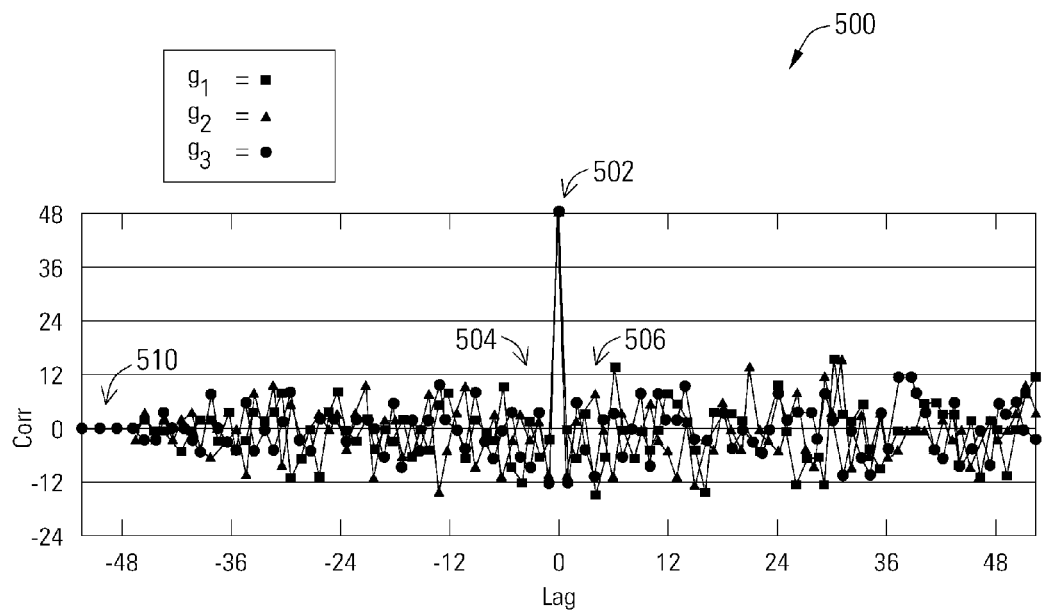
FIG. 5 is a graph of ideal cross-correlation values for three different orthogonal sync marks to be used in alternating data tracks in accordance with some embodiments of the present invention.

Turning to FIG. 5, a plot 500 of the correlations between the readback signal and each of the example 48-bit sync patterns in the readback signal is shown, where $g_1$, $g_2$ and $g_3$ are the three sync patterns being sought. In general, the correlation values are relatively low, between correlation values of about 12 and −12 on either side 504, 506 of the point at which the offset or lag between the readback signal and the sync patterns being sought is 0. Where the lag is 0 at point 502, and the sync patterns being sought match the sync patterns in the readback signal, the correlation is much higher, at a correlation value of about 48. Notably, where the lag is about −48 at point 510 and the shifted readback signal contains the 2T preamble pattern, the correlation value is 0 because the sync pattern being sought is orthogonal to the 2T preamble pattern.

Figure 6:
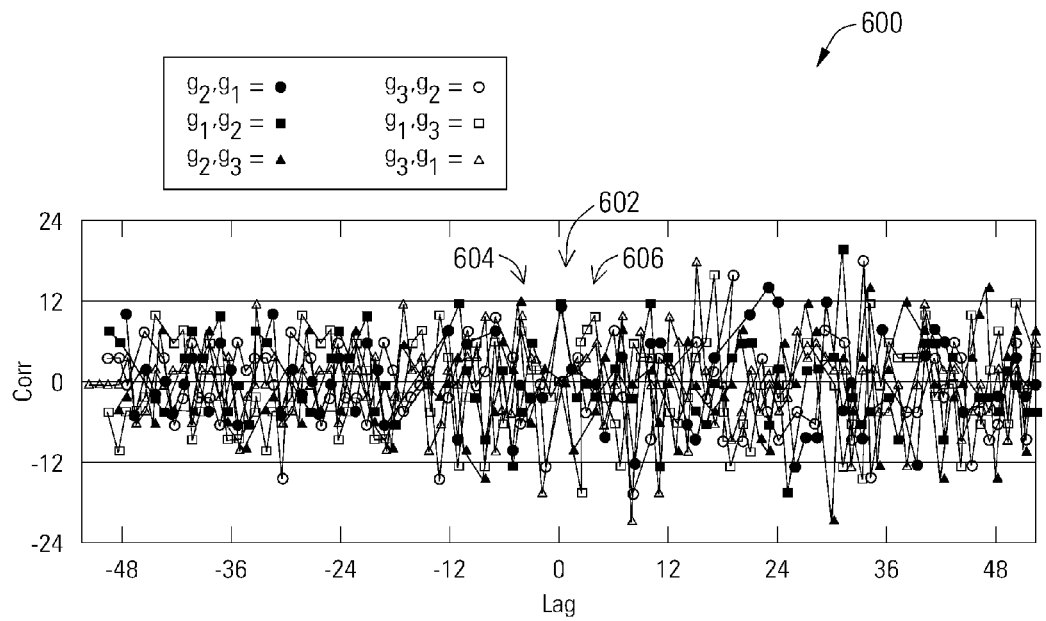
FIG. 6 is a graph of cross-correlation values for three different soft-orthogonal sync marks to be used in alternating data tracks in accordance with some embodiments of the present invention.

Turning to FIG. 6, a plot 600 shows cross-correlation values for the three different example 48-bit long soft-orthogonal sync patterns to be used in alternating data tracks in accordance with some embodiments of the present invention. In plot 600, the lag value represents the shift or offsets between the sync patterns being correlated. Each of the six cross-correlations between the three different sync patterns are shown. In this example, the target track includes the sync pattern corresponding to signal $g_2$, and the neighboring tracks include the sync patterns corresponding to signals $g_1$ and $g_3$. The read head in this example has a position error that shifts it off the center of the target track yielding signal $g_2$ and toward the neighboring track yielding signal $g_1$. Notably, the cross-correlation values between signals $g_2$ and $g_1$ are higher (about 12) than the cross-correlation values (about 0) between signals $g_3$ and $g_2$ and between signals $g_3$ and $g_1$. These higher cross-correlation values can be used to estimate the position error of the read head, or the amount by which the read head is shifted from the center of the target track corresponding with signal $g_2$ toward the neighboring track corresponding with signal $g_1$.

Figure 7:
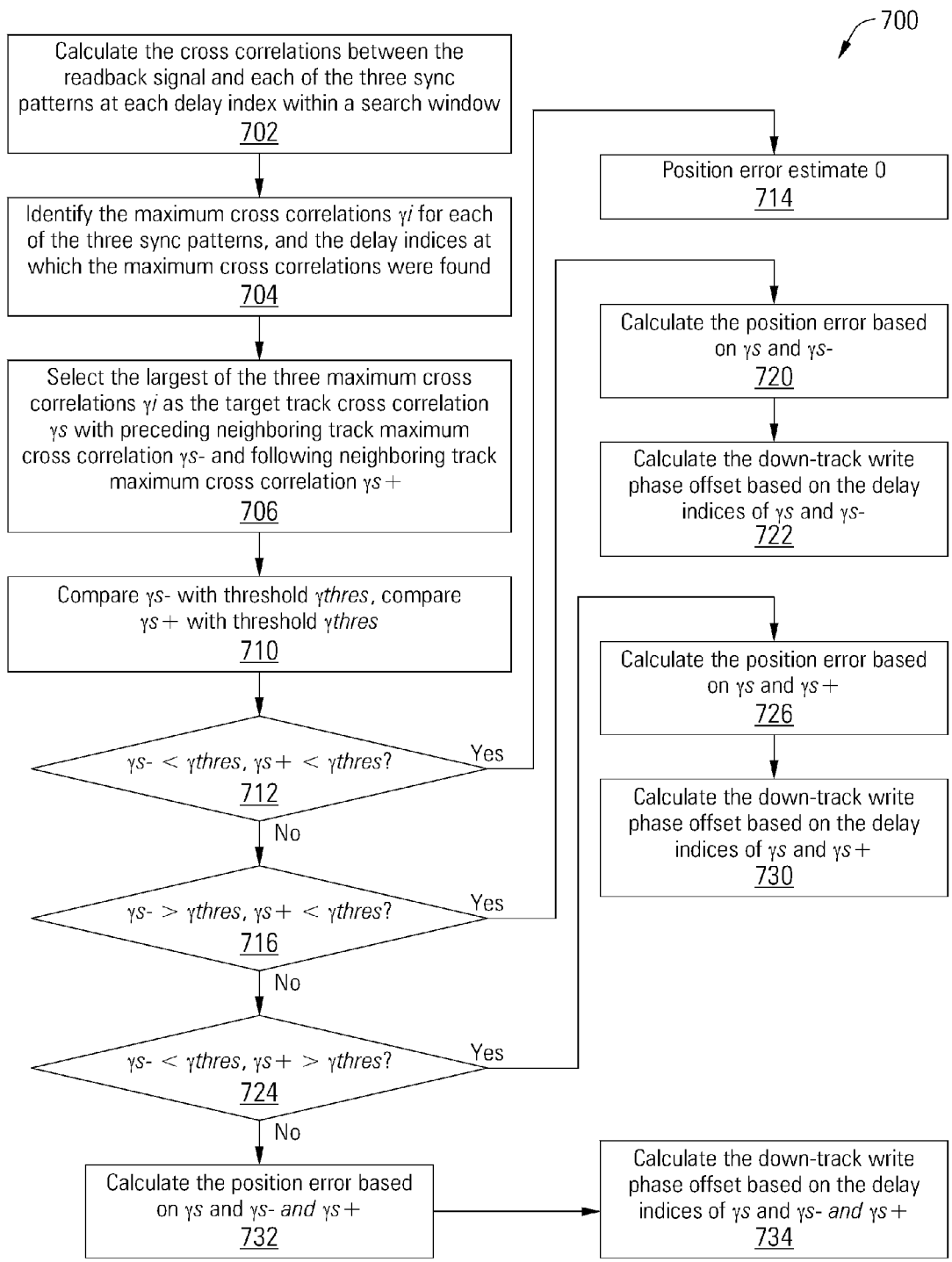
FIG. 7 is a flow diagram showing a method of estimating cross-track read head position errors and down-track write phase offsets in accordance with some embodiments of the present invention.

Turning to FIG. 7, a flow diagram 700 discloses a method in accordance with various embodiments of the present invention for estimating cross-track read head position errors and down-track write phase offsets. Following flow diagram 700, the cross-correlation values between the readback signal and each of the three sync patterns are calculated at each delay index within a search window. (Block 702) This calculation can be represented as:

$$\gamma = \max_{k \in W}\left(\sum_{n=1:L} r[n+k] sync_{ti}[n]\right) \quad \text{(Eq 3)}$$

where r[n] is the readback signal or sequence, k is the lag or delay index, and W denotes the time indexes of the sync search within the search window.

The maximum cross-correlations $\gamma_i$ within the search window are identified for each of the three sync patterns, along with the delay indices at which the maximum cross-correlations were found. (Block 704) The largest of the three maximum cross-correlations $\gamma_i$ is selected as the target track cross-correlation $\gamma_s$ with the preceding neighboring track maximum cross-correlation denoted as $\gamma_{s-}$ and the following neighboring track maximum cross-correlation denoted as $\gamma_{s+}$. (Block 706) For example, if sync patterns sync_t1, sync_t2, and sync_t3 are repeatedly alternated on successive tracks, so that four successive tracks have sync patterns sync_t1, sync_t2, sync_t3, sync_t1, in that order, and if the largest of the three maximum cross-correlations $\gamma_i$ is from the track with sync_t3, then the maximum cross-correlation $\gamma_s$ is for sync_t3, the preceding neighboring track maximum cross-correlation $\gamma_{s-}$ is for sync_t2, and the following neighboring track maximum cross-correlation $\gamma_{s+}$ is for sync_t3. The values of the delay indices k for each of the maximum cross-correlations $\gamma_s$, $\gamma_{s-}$ and $\gamma_{s+}$ are stored to be used to estimate the write phase offset.

A number of different position error cases are possible, depending on the read head width. A threshold $\gamma_{thres}$ is compared with the maximum cross-correlation values $\gamma_s$, $\gamma_{s-}$ and $\gamma_{s+}$ to determine which of the position error cases applies and to determine which of the maximum cross-correlation values $\gamma_s$, $\gamma_{s-}$ and $\gamma_{s+}$ and delay indices k to use to estimate the position error and write phase offset. The preceding neighboring track maximum cross-correlation $\gamma_{s-}$ is compared with threshold $\gamma_{thres}$, and the following neighboring track maximum cross-correlation $\gamma_{s+}$ is compared with threshold $\gamma_{thres}$ (Block 710)

For a first position error case, a determination is made as to whether the preceding neighboring track maximum cross-correlation $\gamma_{s-} < \gamma_{thres}$, and whether the following neighboring track maximum cross-correlation $\gamma_{s+} < \gamma_{thres}$ (Block 712) In this case, the readback signal r[n] is mainly derived from the target track. This position error case applies primarily to a relatively narrow reader which does not substantially overlap neighboring tracks when it is positioned properly over the center line of the target track. When $\gamma_{s-} < \gamma_{thres}$, $\gamma_{thres}$ and $\gamma_{s+} < \gamma_{thres}$ (block 712), the position error $\hat{\delta}$ is estimated to be 0. (Block 714)

For a second position error case, a determination is made as to whether the preceding neighboring track maximum cross-correlation $\gamma_{s-} > \gamma_{thres}$, and whether the following neighboring track maximum cross-correlation $\gamma_{s+} < \gamma_{thres}$ (Block 716) In this case, the readback signal r[n] is mainly derived from the target track and the preceding neighboring track. This position error case applies primarily to a mid-width read head which overlaps a neighboring track at least partially when a position error shifts the read head toward the preceding neighboring track. When $\gamma_{s-} > \gamma_{thres}$ and $\gamma_{s+} < \gamma_{thres}$ (block 716), the position error $\hat{\delta}$ is estimated based on $\gamma_s$ and $\gamma_{s-}$. (Block 720) The down-track write phase offset $\hat{\theta}_{s,s-}$ is estimated based on the delay indices k of $\gamma_s$ and $\gamma_{s-}$. (Block 722) The estimation of the position error $\hat{\delta}$ can be performed according to:

$$\hat{\delta} = \zeta(-\gamma_{s-})/(\gamma_s + \gamma_{s-})$$ (Eq 4)

where $\zeta$ depends on the read head width and sensitivity and can be adjusted based on the particular system conditions. The estimation of the write phase offset $\hat{\theta}_{s,s-}$ can be performed according to:

$$\hat{\theta}_{s,s-} = k_s - k_{s-}$$ (Eq 5)

For a third position error case, a determination is made as to whether the preceding neighboring track maximum cross-correlation $\gamma_{s-} < \gamma_{thres}$, and whether the following neighboring track maximum cross-correlation $\gamma_{s+} > \gamma_{thres}$. (Block 724) In this case, the readback signal r[n] is mainly derived from the target track and the following neighboring track. This position error case applies primarily to a mid-width read head which overlaps a neighboring track at least partially when a position error shifts the read head toward the following neighboring track. When $\gamma_{s-} < \gamma_{thres}$ and $\gamma_{s+} > \gamma_{thres}$ (block 724), the position error $\hat{\delta}$ is estimated based on $\gamma_s$ and $\gamma_{s+}$. (Block 726) The down-track write phase offset $\hat{\theta}_{s,s+}$ is estimated based on the delay indices k of $\gamma_s$ and $\gamma_{s+}$. (Block 730) The estimation of the position error $\hat{\delta}$ can be performed according to:

$$\hat{\delta} = \zeta(\gamma_{s+})/(\gamma_s + \gamma_{s+})$$ (Eq 6)

where $\zeta$ depends on the read head width and sensitivity and can be adjusted based on the particular system conditions. The estimation of the write phase offset $\hat{\theta}_{s,s-}$ can be performed according to:

$$\hat{\theta}_{s,s+} = k_s - k_{s+}$$ (Eq 7)

For a fourth position error case, applying primarily to a wide read head which overlaps both neighboring tracks at least partially, the readback signal r[n] is derived from all three tracks, the target track and at least some of both neighboring tracks. In this case, the position error $\hat{\delta}$ is estimated based on $\gamma_s$ and $\gamma_{s-}$ and $\gamma_{s+}$. (Block 732) The write phase offset $\hat{\theta}_{s,s-}$ between the target track and the preceding neighboring track is estimated based on indices k of $\gamma_s$ and $\gamma_{s-}$, and the write phase offset $\hat{\theta}_{s,s+}$ between the target track and the following neighboring track is estimated based on the delay indices k of $\gamma_s$ and $\gamma_{s+}$. (Block 734) The estimation of the position error $\hat{\delta}$ can be performed according to:

$$\hat{\delta} = \zeta(\gamma_{s+} - \gamma_{s-})/(\gamma_s + \gamma_{s-} + \gamma_{s+})$$ (Eq 8)

where $\zeta$ depends on the read head width and sensitivity and can be adjusted based on the particular system conditions. The estimation of the write phase offsets $\hat{\theta}_{s,s-}$ and $\hat{\theta}_{s,s+}$ can be performed according to Equations 5 and 7.

Notably, the order of comparisons for the four position error cases is not limited to that set forth in the flow chart 700. The comparisons can be performed in parallel or in any order. Some of the position error cases arise only with particular read head widths, and depending on the read head width of the particular system, some elements of the flow chart 700 do not need to be explicitly performed.

Figure 8:
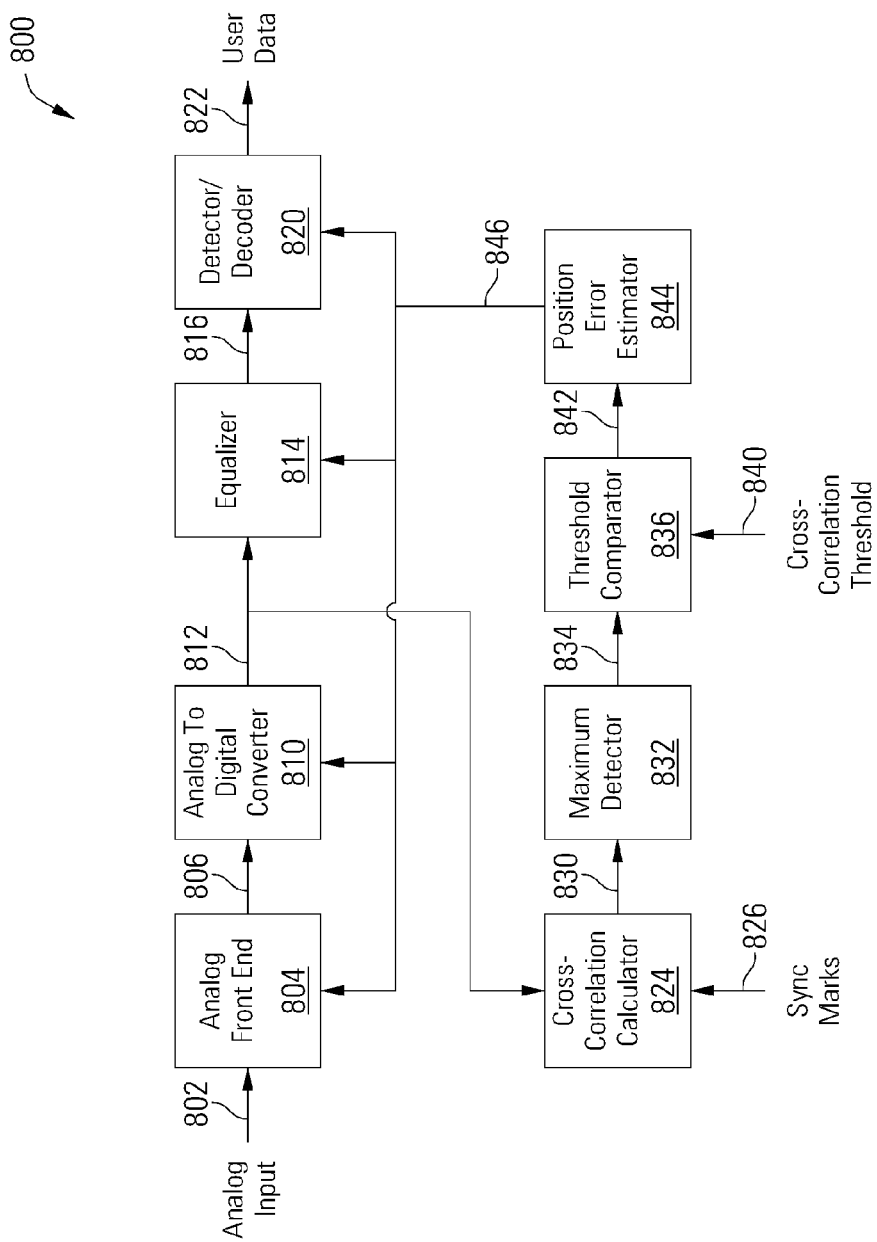
FIG. 8 is a block diagram of a system for sync mark based position error and write phase offset estimation in accordance with some embodiments of the present invention.

Turning to FIG. 8, a block diagram of a data processing system 800 for sync mark based position error and write phase offset estimation is depicted in accordance with some embodiments of the present invention. Data processing system 800 includes an analog front end circuit 804 that receives an analog signal 802. Analog front end circuit 804 processes analog signal 802 and provides a processed analog signal 806 to an analog to digital converter circuit 810. Analog front end circuit 804 may include, but is not limited to, an analog filter and an amplifier circuit as are known in the art. Based upon the disclosure provided herein, one of ordinary skill in the art will recognize a variety of circuitry that may be included as part of analog front end circuit 804. In some embodiments, analog input signal 802 is derived from a read head that is disposed in relation to a magnetic storage medium.

Analog to digital converter circuit 810 converts processed analog signal 806 into a corresponding series of digital samples 812, or x[n]. Digital samples 812 (and signals derived therefrom) prior to being processed by an equalizer circuit 814 are considered X samples. Analog to digital converter circuit 810 can be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 812 are provided to an equalizer circuit 814. Equalizer circuit 814 applies an equalization algorithm to digital samples 812 to yield an equalized output 816 y[n]. In some embodiments of the present invention, equalizer circuit 814 is a digital finite impulse response filter circuit as are known in the art. Equalized output 816 (and signals derived therefrom) after being processed by equalizer circuit 814 contains digital samples which are considered Y samples. The readback signal r[n] used to estimate position error and write phase offset comprises the X samples or digital samples 812 in some embodiments. In some other embodiments, readback signal r[n] used to estimate position error and write phase offset comprises the Y samples or equalized output 816.

Equalized output 816 is provided to a detector/decoder 820 which applies a data detection algorithm and a data decoding algorithm to identify the correct values in equalized output 816, yielding the user data 822 that was originally written to the storage medium if the data can be correctly detected and decoded in detector/decoder 820. In some embodiments, the detector/decoder 820 includes a Viterbi algorithm data detector circuit as are known in the art. In some embodiments, the detector/decoder 820 includes a low density parity check decoder circuit or a Reed Solomon decoder circuit as are known in the art. Based upon the disclosure provided herein, one of ordinary skill in the art will recognize a variety of data detector and decoder circuits that may be used in relation to different embodiments of the present invention.

The readback signal r[n], whether corresponding to digital samples 812 or equalized output 816, is provided to a cross-correlation calculator 824 which calculates the cross-correlations of the readback signal r[n] with the different sync mark patterns 826 within a search window. The cross-correlation calculator 824 provides the cross-correlation values 830 to a maximum detector 832, which finds the maximum cross-correlation values 834 for each of the sync mark patterns 826, as well as the delay indices k of the maximum cross-correlation values 834. The cross-correlation calculator 824 and the maximum detector 832 perform the calculations according to Equation 3 in some embodiments. The maximum detector 832 also identifies the largest of the three maximum cross-correlation values as the target track cross correlation.

A threshold comparator 836 compares each of the maximum cross-correlation values with a cross-correlation threshold 840, yielding comparison results 842. A position error estimator 844 estimates the position error and the write phase offset 846 based on the comparison results 842 and the maximum cross-correlation values and their delay indices k. The threshold comparator 836 and the position error estimator 844 perform the calculations according to Equations 4-8 in some embodiments. The position error and the write phase offset 846 can be provided to one or more of the analog front 804, the analog to digital converter 810, the equalizer 814, and the detector/decoder 820 to provide control and adjustments that facilitate data recovery. For example, the position error and the write phase offset 846 can be used to adjust sampling rate and/or phase in analog to digital converter 810, filter settings in equalizer 814, filter settings in detector/decoder 820, etc.

In general, longer sync patterns 826 can provide better estimation of position error and the write phase offset 846. Cross-correlation with user bits can be reduced further, which makes finding side track sync locations more efficient.

In some embodiments, fractional write phase offset values can be estimated by interpolating between cross-correlation values $\gamma_i$ near their maximum points.

In some embodiments, detecting neighboring track sync patterns from the target track readback signal, where the detection is mainly disturbed by potentially large cross-correlation to user data patterns, can be improved by several additional steps. In these embodiments, the cross-correlation values $\gamma_i$ are estimated as before, but smaller thresholds $\gamma_{thres}$ thres are applied to select multiple candidates for the side track sync locations. Furthermore, including preamble patterns for the computation of cross-correlation values $\gamma_i$, denoted $\gamma_i'$, can reduce the cross-correlation to the user data patterns, while increasing cross-correlation to the preamble patterns, which can be helpful in selecting between the candidates for the side track sync locations.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for sync mark-based read offset detection. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
   a cross-correlation calculator operable to calculate cross-correlations between an input signal and each of three different sync patterns associated with a target track and neighboring tracks;
   a detector operable to select a largest of the cross-correlations;
   a threshold comparator operable to compare the cross-correlations with a threshold to determine a direction of any position error of a read head; and
   a position error estimator operable to estimate a position error of the read head based at least in part on the cross-correlations.

2. The data processing system of claim 1, wherein the position error estimator is further operable to estimate a write phase offset based at least in part on delay indices of the cross-correlations from the cross-correlation calculator.

3. The data processing system of claim 2, wherein the position error comprises a cross-track position error and the write phase offset comprises a down-track shift between the target track and at least one of the neighboring tracks.

4. The data processing system of claim 1, wherein the cross-correlation calculator is operable to calculate the cross-correlations by identifying a largest cross-correlation within a search window between the input signal and each of the three different sync patterns.

5. The data processing system of claim 1, wherein the three different sync patterns are at least substantially orthogonal to each other.

6. The data processing system of claim 1, wherein the three different sync patterns are at least substantially orthogonal to a preamble pattern on the target track and the neighboring tracks and to user data on the target track and the neighboring tracks.

7. The data processing system of claim 1, wherein the position error estimator is operable to estimate the position error as zero when the cross-correlations of the neighboring tracks are below the threshold.

8. The data processing system of claim 1, wherein when the cross-correlation of one of the neighboring tracks is above the threshold and the cross-correlation of another of the neighboring tracks is below the threshold, the position error estimator is operable to estimate the position error based on the cross-correlation of the neighboring track which is greater than the threshold, divided by the cross-correlation of the target track plus the cross-correlation of the neighboring track which is greater than the threshold.

9. The data processing system of claim 1, wherein when the cross-correlation of one of the neighboring tracks is above the threshold and the cross-correlation of another of the neighboring tracks is below the threshold, the position error estimator is operable to estimate the write phase offset based on a difference between the delay indices of the cross-correlation of the target track and the cross-correlation of the neighboring track which is greater than the threshold.

10. The data processing system of claim 1, wherein when the cross-correlations of both of the neighboring tracks are above the threshold, the position error estimator is operable to estimate the position error based on a difference between the cross-correlations of the neighboring tracks, divided by a sum of the cross-correlations of the target track and of the neighboring tracks.

11. The data processing system of claim 1, wherein when the cross-correlations of both of the neighboring tracks are above the threshold, the position error estimator is operable to estimate the write phase offsets between the target track and each of the neighboring tracks based on differences between the delay indices of the cross-correlation of the target track and the cross-correlations of the neighboring tracks.

12. A method for estimating a cross-track read head position errors, comprising:
    calculating cross-correlations between a readback signal and each of three sync patterns associated with a target track and two neighboring tracks within a search window;
    identifying a maximum cross-correlation for each of the three sync patterns and a delay index at which each of the maximum cross-correlations occur within the search window;
    selecting a largest of the three maximum cross-correlations as a target track cross-correlation; and
    estimating the cross-track read head position error based at least in part on the three maximum cross-correlations.

13. The method of claim 12, further comprising comparing the cross-correlations of the two neighboring tracks with a threshold.

14. The method of claim 13, wherein when the cross-correlations of the two neighboring tracks are both lower than the threshold, the cross-track read head position error is estimated to be zero.

15. The method of claim 13, wherein when the cross-correlation of one of the two neighboring tracks is higher than the threshold and another of the two neighboring tracks is higher than the threshold, the cross-track read head position error is estimated based on the cross-correlation of the neighboring track which is greater than the threshold, divided by the cross-correlation of the target track plus the cross-correlation of the neighboring track which is greater than the threshold.

16. The method of claim 15, wherein when the cross-correlation of one of the two neighboring tracks is higher than the threshold and another of the two neighboring tracks is higher than the threshold, a write phase offset is estimated based on a difference between the delay indices of the cross-correlation of the target track and the cross-correlation of the neighboring track which is greater than the threshold.

17. The method of claim 13, wherein when the cross-correlations of both of the two neighboring tracks are higher than the threshold, the cross-track read head position error is estimated based on a difference between the cross-correlations of the neighboring tracks, divided by a sum of the cross-correlations of the target track and of the neighboring tracks.

18. The method of claim 13, wherein when the cross-correlations of both of the two neighboring tracks are higher than the threshold, write phase offsets between the target track and each of the neighboring tracks are estimated based on differences between the delay indices of the cross-correlation of the target track and the cross-correlations of the neighboring tracks.

19. The method of claim 12, further comprising interpolating between the maximum cross-correlations to yield interpolated maximum cross-correlations and estimating a write phase offset based at least in part on the interpolated maximum cross-correlations.

20. A data storage device, comprising:
    a storage medium;
    a read head disposed in relation to the storage medium operable to yield an analog signal;
    an analog to digital converter circuit operable to produce digital samples from the analog signal;
    an equalizer operable to filter the digital samples to yield an equalized output;
    a detector/decoder circuit operable to process the equalized output to identify original values of the equalized output as written to the storage medium; and
    a position error estimator operable to calculate cross-correlation values between a readback signal derived from the digital samples and each of three different sync patterns, to select between a plurality of position error cases, and to estimate a position error based at least in part on the cross-correlation values and a selected one of the position error cases.

* * * * *